(12) United States Patent
Gottlieb et al.

(10) Patent No.: US 8,276,058 B2
(45) Date of Patent: Sep. 25, 2012

(54) METHOD OF AUTOMATICALLY POPULATING AND GENERATING FLOWERCHART CELLS

(75) Inventors: Harry N. Gottlieb, Chicago, IL (US); Edward N. Lott, Chicago, IL (US); Gabriel Val, Evanston, IL (US)

(73) Assignee: The Jellyvision Lab, Inc., Chicago, IL (US)

( * ) Notice: Subject to any disclaimer, the term of this patent is extended or adjusted under 35 U.S.C. 154(b) by 842 days.

(21) Appl. No.: 12/028,283

(22) Filed: Feb. 8, 2008

(65) Prior Publication Data

US 2008/0244376 A1 Oct. 2, 2008

Related U.S. Application Data

(60) Provisional application No. 60/888,923, filed on Feb. 8, 2007.

(51) Int. Cl.
*G06F 17/00* (2006.01)
*G06F 17/20* (2006.01)

(52) U.S. Cl. ........................................ 715/212; 715/211

(58) Field of Classification Search .................. 715/212
See application file for complete search history.

(56) References Cited

U.S. PATENT DOCUMENTS

| 4,538,188 A | 8/1985 | Barker et al. |
|---|---|---|
| 4,831,525 A | 5/1989 | Saito et al. |
| 4,831,580 A | 5/1989 | Yamada |
| 4,852,047 A | 7/1989 | Lavallee et al. |
| 4,875,187 A | 10/1989 | Smith |
| 4,893,256 A | 1/1990 | Rutherfoord et al. |
| 4,931,950 A | 6/1990 | Isle et al. |
| 4,933,880 A | 6/1990 | Borgendale et al. |
| 4,956,773 A | 9/1990 | Saito et al. |
| 5,111,409 A | 5/1992 | Gasper et al. |
| 5,119,474 A | 6/1992 | Beitel et al. |
| 5,261,041 A | 11/1993 | Susman |
| 5,307,456 A | 4/1994 | MacKay |
| 5,386,508 A | 1/1995 | Itonori et al. |
| 5,418,622 A | 5/1995 | Takeuchi |

(Continued)

FOREIGN PATENT DOCUMENTS

EP 0 438 299 A2 7/1991

(Continued)

OTHER PUBLICATIONS

Watts et al.,"The SFC Editor A Graphical Tool for Algorithm Development", Consortium for Computing Science in Colleges 2004, pp. 73-85.*

(Continued)

*Primary Examiner* — Doug Hutton, Jr.
*Assistant Examiner* — James Debrow
(74) *Attorney, Agent, or Firm* — Brinks Hofer Gilson & Lione

(57) ABSTRACT

A method for creating a multimedia experience is disclosed. The method includes defining a first cell, defining a first branch selectively associated with the first cell, and defining a second branch selectively associated with the first cell. The method further includes associating a variable with the first cell that is configured to identify one of the first and second branches. The method further includes defining a second cell, associating the second cell to the first cell such that the variable is reflected in the second cell, and generating copies of the first and second branches in response to the association of the variable to the second cell.

10 Claims, 6 Drawing Sheets

U.S. PATENT DOCUMENTS

| | | | |
|---|---|---|---|
| 5,430,872 A | | 7/1995 | Dahod et al. |
| 5,446,911 A | | 8/1995 | Juso et al. |
| 5,515,490 A | | 5/1996 | Buchanan et al. |
| 5,519,828 A | | 5/1996 | Rayner |
| 5,530,856 A | | 6/1996 | Dahod et al. |
| 5,546,529 A | | 8/1996 | Bowers et al. |
| 5,555,357 A | * | 9/1996 | Fernandes et al. ............ 345/441 |
| 5,581,759 A | | 12/1996 | Ohhashi et al. |
| 5,586,311 A | | 12/1996 | Davies et al. |
| 5,590,253 A | | 12/1996 | Onishi et al. |
| 5,592,602 A | | 1/1997 | Edmunds et al. |
| 5,619,636 A | | 4/1997 | Sweat et al. |
| 5,630,017 A | | 5/1997 | Gasper et al. |
| 5,640,590 A | | 6/1997 | Luther |
| 5,692,212 A | | 11/1997 | Roach |
| 5,697,788 A | | 12/1997 | Ohta |
| 5,708,845 A | | 1/1998 | Wistendahl et al. |
| 5,717,879 A | | 2/1998 | Moran et al. |
| 5,721,959 A | | 2/1998 | Nakamura et al. |
| 5,752,029 A | | 5/1998 | Wissner |
| 5,754,851 A | | 5/1998 | Wissner |
| 5,806,079 A | | 9/1998 | Rivette et al. |
| 5,818,435 A | | 10/1998 | Kozuka et al. |
| 5,870,768 A | | 2/1999 | Hekmatpour |
| 5,892,507 A | | 4/1999 | Moorby et al. |
| 5,893,105 A | * | 4/1999 | MacLennan ........................ 1/1 |
| 5,905,981 A | | 5/1999 | Lawler |
| 6,034,692 A | | 3/2000 | Gallery et al. |
| 6,058,333 A | | 5/2000 | Klein et al. |
| 6,072,480 A | | 6/2000 | Gorbet et al. |
| 6,097,887 A | | 8/2000 | Hardikar et al. |
| 6,100,881 A | | 8/2000 | Gibbons et al. |
| 6,144,938 A | | 11/2000 | Surace et al. |
| 6,154,600 A | | 11/2000 | Newman et al. |
| 6,179,490 B1 | | 1/2001 | Pruitt |
| 6,184,879 B1 | | 2/2001 | Minemura et al. |
| 6,212,674 B1 | * | 4/2001 | Suckow ........................ 717/109 |
| 6,239,800 B1 | | 5/2001 | Mayhew et al. |
| 6,243,857 B1 | | 6/2001 | Logan et al. |
| 6,314,569 B1 | | 11/2001 | Chernock et al. |
| 6,334,103 B1 | | 12/2001 | Surace et al. |
| 6,346,945 B1 | | 2/2002 | Mansurov et al. |
| 6,356,867 B1 | | 3/2002 | Gabai et al. |
| 6,370,683 B1 | | 4/2002 | Sobers |
| 6,421,821 B1 | * | 7/2002 | Lavallee ........................ 717/109 |
| 6,496,208 B1 | | 12/2002 | Bernhardt et al. |
| 6,654,803 B1 | | 11/2003 | Rochford et al. |
| 6,674,955 B2 | | 1/2004 | Matsui et al. |
| 6,754,540 B1 | * | 6/2004 | McFarland et al. ............. 700/18 |
| 6,816,174 B2 | | 11/2004 | Tiongson et al. |
| 6,873,344 B2 | | 3/2005 | Samra et al. |
| 6,973,639 B2 | | 12/2005 | Hashimoto et al. |
| 7,310,784 B1 | | 12/2007 | Gottlieb et al. |
| 7,340,715 B2 | * | 3/2008 | Liu ................................ 717/105 |
| 7,647,577 B2 | * | 1/2010 | Wang et al. .................... 717/105 |
| 7,793,219 B1 | | 9/2010 | Stratton et al. |
| 2002/0038206 A1 | | 3/2002 | Dori |
| 2002/0089527 A1 | | 7/2002 | Paradies |
| 2002/0140731 A1 | | 10/2002 | Subramaniam et al. |
| 2004/0070594 A1 | | 4/2004 | Burke |
| 2004/0196310 A1 | | 10/2004 | Aamodt et al. |
| 2005/0132173 A1 | * | 6/2005 | Moyer et al. .................. 712/238 |
| 2007/0227537 A1 | * | 10/2007 | Bemister et al. ......... 128/200.24 |
| 2007/0234196 A1 | | 10/2007 | Nicol et al. |
| 2007/0240046 A1 | | 10/2007 | Yan et al. |
| 2008/0065977 A1 | | 3/2008 | Gottlieb et al. |
| 2008/0104121 A1 | | 5/2008 | Gottlieb et al. |
| 2008/0184143 A1 | | 7/2008 | Gottlieb et al. |
| 2008/0244376 A1 | | 10/2008 | Gottlieb et al. |

FOREIGN PATENT DOCUMENTS

| | | |
|---|---|---|
| EP | 0 661 631 A2 | 7/1995 |
| EP | 1667115 A2 | 6/2006 |
| JP | 63 127333 | 5/1988 |
| JP | 5 257666 A2 | 10/1993 |
| JP | 8 96001 | 4/1996 |
| JP | 8 263536 | 10/1996 |
| JP | 2002 120174 | 4/2002 |
| WO | WO 96/19779 | 6/1996 |
| WO | WO 96/26600 | 8/1996 |

OTHER PUBLICATIONS http://hi.baidu.com/anycai/blog/item/998219d193aebbd3572c848b. html, Using Macromedia Flash Asset Xtra (Part I), retrieved from Internet, 2006, 3 pages.*

PCT International Search Report/Written Opinion of the International Searching Authority (the European Patent Office) regarding Application No. PCT/US08/53407, dated May 23, 2008, 8 pages.

Quality America Inc., Flowchart/Cause & Effect Features, Jun. 21, 2000, pp. 1-4.

Goofy Animation System, Technical Report 266, Lindsey Ford Department of Computer Science University of Exeter, Exeter EX4 4PT, U.K. Nov. 5, 1993, pp. 1-15.

A Multimedia Presentation Mechanism Permitting Partial Loss of Objects, Han Il Kim et al., Dept. of Computer Eng., pp. 847-851 (1992).

STORM Structural and Temporal Object-oRiented Multimedia database system, Michel Adiba, IMAG-LGI, Grenoble University, BP 53, 38041 Grenoble Cedex 9 France, pp. 12-19 (1995).

*Shelldrake Developer*, http://www.shelldrake.com/Developer/faqs.htm, 3 pages (2000).

*Shelldrake Developer*, http://www.shelldrake.com/Developer/StoryFirst.htm, 3 pages (2000).

"allCLEAR User's Guide," Version 4.5, SPSS Inc., 1999 (218 pages).

"Anark Studio™ User Guide," Version date: Feb. 16, 2005. 324 pages.

"Cubase SX/SL 3 Music Creation and Production System," Getting Started, Manual by Anders Nordmark, Steinberg Media Technologies GmbH, 2004. 268 pages.

"Cubase SX/SL 3 Music Creation and Production System," Operation Manual, Manual by Anders Nordmark, Steinberg Media Technologies GmbH, 2004. 810 pages.

"Macromedia FLASH™MX 2004 Getting Started with Flash," Macromedia, Inc. 2004. 68 pages.

"Macromedia FLASH™MX 2004 Using Flash," Macromedia, Inc. 2004. 498 pages.

"Macromedia Authorware7 Using Authorware 7," Macromedia, Inc., 2003. 286 pages.

"Using Authorware passage", Using Authorware, Macromedia, US, Aug. 2001, page complete, XP002343353, pp. 13, 33-34, 41, 48.

Shih, T. K. et al: "Multimedia presentation design using data flow diagrams", Intelligent Processing Systems, 1997, ICIPS '97, 1997 IEEE International Conference on Beijing, China, Oct. 28-31, 1997, New York, NY, USA, IEEE, US, vol. 2, Oct. 28, 1997, pp. 1716-1720, XP010276159, ISBN: 0-7803-4253-4, the whole document.

Bell, M. A. et al.: "CALVIN-courseware authoring language using visual notation", Visual Languages, 1993, Proceedings 1993 IEEE Symposium on Bergen, Norway, Aug. 24-27, 1993, Los Alamitos, CA, USA, IEEE Comp. Soc., US, Aug. 24, 1993, pp. 225-230, XP010032717, ISBN: 0-8186-3970-9, the whole document.

Dick C. A. Bulterman and Lynda Hardman: "Structured Multimedia Authoring", ACM Transactions on Multimedia Computing, [Online] 2005, XP002487484, Retrieved from the Internet: URL: http://homepages.cwi.nl/{dcab/PDF/tomccap05.pdf> the whole document.

PCT International Search Report/Written Opinion of the International Searching Authority (the European Patent Office) regarding Application No. PCT/US2007/087618, dated Jul. 23, 2008, 14 pages.

Office Action regarding U.S. Appl. No. 11/925,460 dated Apr. 19, 2012, 11 pgs.

"Using Macromedia Flash Asset Xtra (Part 1)," 2006. Retrieved from the Internet: URL: http://hi.baidu.com/anycai/blog/item/998219d193aebbd3572c848b.html, 3 pgs.

* cited by examiner

| | VARIABLE ID | CONDITION | VALUE | LINKED TO | CELL TYPE | TEXT |
|---|---|---|---|---|---|---|
| 1 | g.wanttogoout | YES | 1 | 106 | SIMPLE | "ALRIGHT…" |
| 2 | g.wanttogoout | NO | 0 | 108 | SIMPLE | "OK, COUCH…" |
| 3 | g.wanttogoout | MAYBE | 0 | 110 | SIMPLE | "WELL, I…" |
| | | | | | | |
| 4 | REFERENCE ID | 104 | | | | |
| 5 | REFERENCED BY | 114 | | | | |
| 6 | UPDATE | AUTO | | | | |

| | VARIABLE ID | CONDITION | VALUE | LINKED TO | CELL TYPE | TEXT |
|---|---|---|---|---|---|---|
| 1 | g.wanttogoout | YES | 1 | 106 | SIMPLE | "ALRIGHT..." |
| 2 | g.wanttogoout | NO | 0 | 108 | SIMPLE | "OK, COUCH..." |
| 3 | g.wanttogoout | MAYBE | 0 | 110 | SIMPLE | "WELL, I..." |
| | | | | | | |
| 4 | REFERENCE ID | 104 | | | | |
| 5 | REFERENCED BY | 114 | | | | |
| 6 | UPDATE | AUTO | | | | |
| | | | | | | |
| 7 | g.wanttogoout | YES | 1 | 106' | SIMPLE | "BRING..." |
| 8 | g.wanttogoout | NO | 0 | 108' | SIMPLE | "WHAT'S ON..." |
| 9 | g.wanttogoout | MAYBE | 0 | 110' | SIMPLE | "WELL..." |
| | | | | | | |

METHOD OF AUTOMATICALLY POPULATING AND GENERATING FLOWERCHART CELLS

CROSS REFERENCE TO RELATED APPLICATIONS

This patent claims the priority benefit under 35 U.S.C. §119(e) of U.S. provisional patent application Ser. No. 60/888,923, filed on Feb. 8, 2007, the content of which is hereby incorporated by reference for all purposes.

BACKGROUND

A multimedia experience refers to the use of media in an interactive environment. The media generally include one or more types of information content, including for example, text, audio, graphics, animation, and video. During a multimedia experience, the media is presented to an end-user according to a logical sequence that can be affected by the end-user's actions.

A multimedia experience can be modeled as a flowchart that defines the logical sequence for playback of the multimedia experience. Such a flowchart generally consists of a sequence of linked cells that directly or indirectly reference media assets to be played by an application in a predefined order. The selection of which media referenced in the cells will be played can depend, in part, upon the choices made by end-users during each playback session of the multimedia experience. Flowcharts can be prepared by hand using pencil and paper or can be prepared electronically using a computer. Some software applications require a user to build a flowchart by drawing graphical shapes and then typing text into each graphical shape.

Depending upon the sophistication and complexity of the multimedia experience, a flowchart may require a large investment in programming time and configuration to achieve a desired result. It is desirable to provide tools, methods and systems which can be utilized to aid an experience designer or programmer in the creation and design of the flowcharts.

SUMMARY

This patent discloses tools, methods and systems for defining and automatically populating cells and structures utilized in the creation and design of an interactive multimedia experience. The tools, methods and systems include provisions for storing and defining properties associated with a first or base cell, and provisions for transferring or copying the properties to a second or reference cell that has been associated with the first or base cell.

In one embodiment, a method for supporting the creation of a multimedia experience is disclosed. The method includes, defining a first cell, defining a first branch having a first value, wherein the first branch is associated with the first cell, defining a second branch having a second value, wherein the second branch is associated with the first cell, associating a variable with the first cell wherein the variable is associated with the first and second values, defining a second cell, and associating the second cell to the variable. The method further includes generating a third branch and a fourth branch associated with the second cell such that one of the third and fourth branches reflects the first value, and the other of the third and fourth branches reflects the second value.

In another embodiment, a method for supporting the creation of a multimedia experience is disclosed. The method includes defining a first cell, wherein the first cell is associated with at least a first branch and a second branch, defining a second cell, associating the second cell to the first cell, and generating a third branch and a fourth branch associated with the second cell in response to the association to the first cell.

In another embodiment, a method of supporting the creation of a multimedia experience is disclosed. The method includes defining a variable, associating a first value and a second value to the variable, defining a cell, linking the variable with the cell, creating a first branch associated with the cell, the first branch representative of the first value, and creating a second branch associated with the cell, the second branch representative of the second value.

In another embodiment, a method of supporting the creation of a multimedia experience is disclosed. The method includes defining a variable, wherein the variable is configured to represent a first branch and a second branch, defining a cell, and linking the variable with the cell such that the first branch and second branch are associated with the cell in response to the linking.

Additional features and advantages of the present invention are described in, and will be apparent from, the following Detailed Description and the figures.

DETAILED DESCRIPTION

The present disclosure provides and teaches a system and method of creating, generating or defining a flowchart structure representative of a multimedia experience. The tools, methods and systems disclosed herein may be implemented using software and/or hardware components. For example, in one embodiment, a tool may be stored on a computer readable medium as a computer-readable program code or routines. These routines or computer-readable code may, in turn, be implemented or executed on a processor in communication with the memory. The results of the executed computer-readable code may be displayed on a monitor such as a Liquid Crystal Display (LCD), audibly played or presented through a speaker or telephone system, stored on a memory or otherwise provided to a user in a discernable format. In another embodiment, some or all of the functionality of the tools, method or systems may be implemented with application-specific hardware components. For simplicity, the term "application" shall be used herein to refer generally to the entity (be it software and/or hardware) used to implement the preferred embodiments described below. The term "tool" shall be used interchangeably with the term "application."

Figure 1:
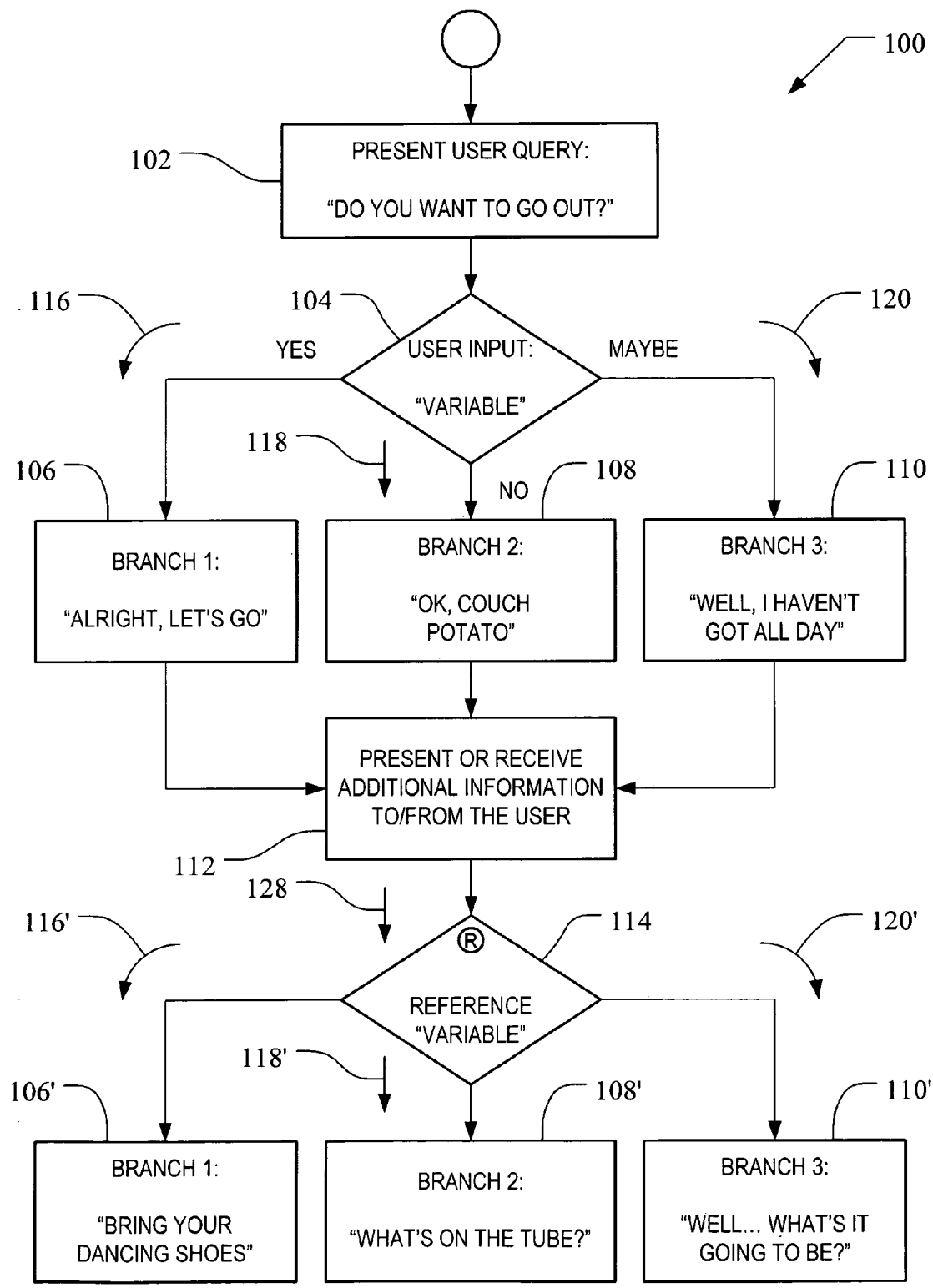
FIG. 1 illustrates a flowchart of an exemplary multimedia experience that may be created utilizing the teachings disclosed herein.

FIG. 1 illustrates an embodiment of a flowchart 100 representing a multimedia experience that may be created or defined by the tools or applications taught or disclosed provided herein. As used herein, the term "flowchart" refers to any graphical representation of a branching structure. The flowchart 100 includes a sequence of organized and linked cells 102 to 114. As will be described herein, each of the cells 102 to 114 represents: (a) media content such as textual information, pictures, movie clips, and/or audio files to be played or presented to a user in a timed manner; (b) user interactivity and/or controls utilized to query or receive information from a user; (c) branching locations or control points within the flowchart utilized to direct or route the user through the multimedia experience, and (d) activities, calculations and/or operations performed during the execution of the multimedia experience. It will be understood that the layout and display of the flowchart and the links connecting each of the individual cells 102 to 114 represents the flow or presentation of the cells contents within the multimedia experience as a function of time.

The cells 102 to 114 that comprise the exemplary flowchart 100 are illustrated as graphical symbols which may be displayed as a part of a graphical user interface (GUI) portion executing upon a computer operating system (OS) such as, for example, MICROSOFT® WINDOWS XP®, LINUX, and OS X or LEOPARD® provided by APPLE, INC.®. The graphical symbols representing cells 102 to 114 may correspond to the action, function or operation associated with and performed by that cell. For example, a rectangular shaped cell may represent a "simple cell" in which information is played or presented to the user interacting with the multimedia experience. Simple cells such as, for example, the cell 102, may contain a single link to another cell single cell. In another example, a diamond shaped cell may represent a "conditional cell" which contains or receives information to direct the multimedia experience along a branch or path of the flowchart 100. Conditional cells such as, for example, the cell 104 may operate as branching locations and contain multiple branches or paths that are links to multiple cells.

It should be noted that each cell within the flowchart 100 may be defined to contain two or more individual cells (simple cells or conditional cells). These multiple cell configurations are referred to herein as "group cells." Group cells can be used to simplify the presentation, display and organization of the flowchart 100 by grouping multiple cells that would normally be displayed individually into a single, aggregate cell. In addition to simple and conditional cells, a group cell can contain other group cells (i.e., groups cells can be nested) and other types of cells, such as "go to" cells, "alias" cells, and other types of cells described in the next paragraph. "Go to" cells can be used instead of a line to show the flow from that cell to another cell. In this way, "go to" cells can be used to keep a flowchart clean and readable. "Alias" cells can be used to mimic the function/operation of another cell.

The flowchart 100 may further contain other cells known as "input cells." As the name implies, input cells can indicate positions or times within the flow of the multimedia experience represented by the flowchart 100 when the user is expected to provide information or make a selection or decision. Alternatively, an input cell may be associated with an internal variable having a value, such as a Boolean operator, a number, a character string, or a collection of information that is assigned or determined during the run or execution of the multimedia experience. For example, the internal variable may be populated by a database entry communicated in response to, for example, a user selection or indication, the passage of time within the multimedia experience, the day or time at which the multimedia experience is executed or any other programmable or selectable occurrence. The information associated with the variable, in turn, may be utilized at runtime to determine an instantaneous route or path through the multimedia experience and/or may be stored in a memory or database for use in other aspects of the multimedia experience.

Yet another type of cell that may be utilized in the execution or operation of a multimedia experience is a "reference cell." Reference cells are constructs that may be associated with an input cell or a variable associated with the input cell, stored within a database or memory or otherwise available for use within the flowchart 100 representing the multimedia experience. In this way, information provided in one part of the multimedia experience may be utilized during playback or runtime to influence or guide the flow in another, possibly unrelated, portion of the multimedia experience.

In the present embodiment, for example, the simple cell 102 is configured to present information to the user during playback and is linked or coupled to the input cell 104 configured to receive information provided by the user. Alternatively, the cell 104 may be configured to both present information to a user of the multimedia experience and receive information or instructions from the user or other portions of the multimedia experience. The cell 104 may be further configured to provide or operate as a branching location that connects or includes three branches 116, 118 and 120 leading to cells 106, 108 and 110, respectively.

Figures 2, 3:
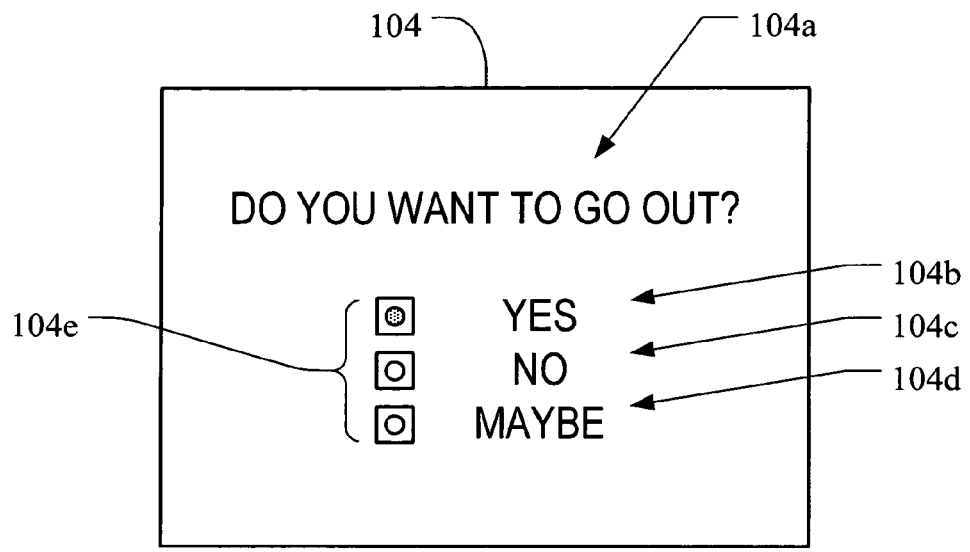
FIG. 2 illustrates an exemplary display that may be presented by the multimedia experience.
FIGS. 3 and 3A illustrate embodiments of cell property tables that may be utilized to construct the multimedia experience represented by the flowchart shown in FIG. 1.

FIG. 2 represents a prompt that may be presented to the user as a part of a graphical user interface or multimedia experience interface during playback of the experience represented by the flowchart. The prompt can be any combination of audio, text on-screen, still graphics, animation, and/or video. In this exemplary embodiment, the prompt presents a question 104a to the user. The question 104a states: "Do You Want To Go Out?" The question 104a, in this embodiment, is accompanied by pre-defined responses or answers 104b to 104d. For example, in response to the question "Do You Want To Go Out?" the user may indicate, "Yes" by selecting a conditional or check box 104e adjacent to the response 104b. Alternatively, the user may indicate "No" or "Maybe" by selecting the appropriate check box 104e. In yet another alternative, the response may be received via a text input box. In this way, the user may type or otherwise enter a text-based response to the question 104a.

Returning to FIG. 1, the cells 106, 108 and 110 correspond to the responses 104b, 104c and 104d shown in FIG. 2, respectively. Thus, if, during playback of the experience represented by the flowchart, the user indicates that they do want to go out by selecting the "Yes" response 104b, then the input cell 104 directs the flow of the multimedia experience along the branch 116 to the cell 106. It will be understood that if the user selected a different response, i.e. the "No" response 104c or the "Maybe" response 104d, then the input cell 104 would direct the flow of the multimedia experience along either the branch or path 118 or 120, respectively.

The designer of the multimedia experience, in order to establish these relationships, may program and configure a number of properties associated with the input cell 104. For example, the input cell 104 may define and contain one or more variables to store the user's response to the question 104a. The variables are defined during the design of the flowchart, and may be identified by name, such as "g.wanttogoout" or "g.test". Variables can contain Booleans, integers, strings, or complex data types such as records and arrays. During playback of a multimedia experience, each of these variables may have values assigned to them and read back from them. Variables may further be configured as raw variables which operate as intermediates or placeholders for values that may be further processed to determine the path or branch to be followed or used in calculations defined as a part of the multimedia experience. The results of a processed value may, in turn, be communicated to an assignment variable which can be utilized throughout the multimedia experience.

With respect to the input cell 104, for example, a flowchart designer identifies by name a single variable with which the input cell will be associated. If the variable had never before been referred to in the flowchart, it is defined on-the-fly the first time a designer names it. In some situations, it may be known during design-time what values may possibly be assigned to the variable at runtime. One such example is an input cell, wherein each branching link from the input cell has a corresponding value that will be assigned to the input cell's assignment variable during playback whenever a user makes a selection that causes playback to proceed down that particular branch. Once defined, variables may be referred to at design-time from anywhere else in the flowchart. An example of such a variable reference would be the reference cell. It too, has a variable identified by the flowchart designer associated with it. When playback reaches a reference cell, the variable associated with it (a.k.a., its reference variable) is inspected, and the value that it contains determines the particular branch that playback will follow. This is possible because each branch of a reference cell corresponds to one of the known possible values of the variable, this being due to the fact that the variable is also associated with an input cell that contains a finite set of discrete, known values, corresponding to its branches.

In other embodiments, a set of possible values may be known at design-time to be possibly associated with a variable at runtime as a result of associations with elements in the flowchart or application other than an input cell or its associated variable. These alternative sources may include any of the following group: manual selection of or entering in of representations of values using an input device; reading from another variable at runtime, such other variable having been defined at design-time; or by assignment of values to the variable through the execution of program code or instructions written by a user of the design-time system (i.e., the flowchart designer).

Figure 2A:
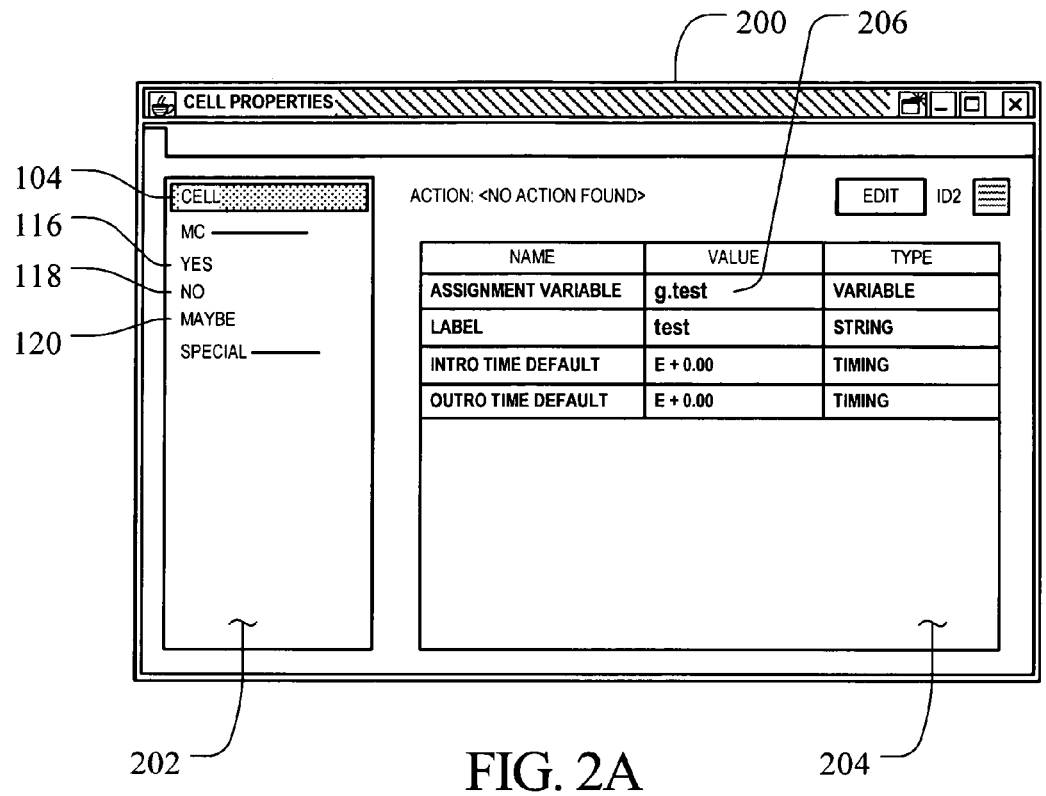
FIGS. 2A to 2F illustrate exemplary embodiments of cell properties that may be established to construct the multimedia experience represented by the flowchart shown in FIG. 1.

FIG. 2A represents a cell properties window 200 that may be associated with the branching location represented by the cell 104. The cell properties window 200 may include an element window 202 and a properties window 204. The element window may provide a list of elements associated with or connected to a cell, branching location or other graphical symbol represented within the flowchart 100. The properties window 204 may, in turn, be a listing or representation of the properties or potential properties associated or defined in connection with the element, cell or branching location selected in the element window 202. For example, the cell properties window 200 includes a list of the conditionals or possible responses associated with the branching location 104. The "Yes" response or condition associated with branch 116 may be selected in the element window 202 and the properties window 204 could then dynamically be reconfigured to display the properties associated therewith. Similarly, the "No" and "Maybe" responses or conditions associated with the branches 118 and 120, respectively, are listed and available for selection in the element window 202.

The properties window 204, in this present example, displays the properties associated with the branching location or input cell 104. For example, the cell 104 may be associated with a variable 206 identified as "g.test." In this example, it will be understood that a value associated with the variable 206 will be provided from the input cell during playback of the multimedia experience, by virtue of the association of the variable 206 with the cell 104. Alternatively it will be understood that a value associated with the variable 206 may be provided from a different element or portion of the multimedia experience during playback, at some time prior to or subsequent to processing of the user input received at the cell 104. In other words, the value of the variable 206 may be received from another input cell, subroutine, database and/or calculation performed within or associated with the multimedia experience. The properties windows 204 may further include listings of the type of variable, properties or values associated with the cell 104. The properties windows 204 may further include timing or duration properties associated with the playing or execution of the media or elements represented by the cell 104 during the execution or presentation of the multimedia experience.

Figure 2B:
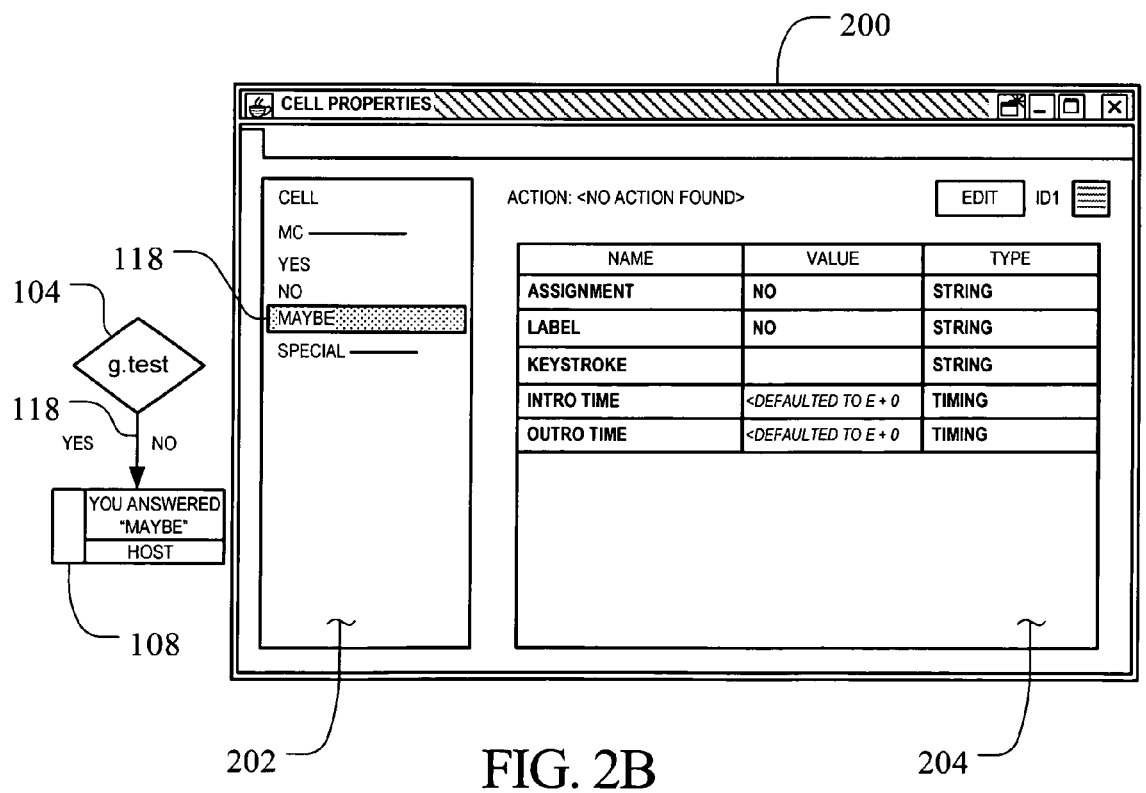

FIG. 2B illustrates an embodiment of the cell properties window 200 configured to display the properties associated with the "No" response and branch 118 in the properties window 204. In this example, the assignment value associated with the branch 118 includes the string "No."

Returning to FIG. 1, the cell 112 represents one or more points within the flowchart 100 when the three exemplary branches 116, 118 and 120 of this exemplary embodiment converge back to a single branch 128. At this point or convergence location in the multimedia experience additional information, media files or other well-understood actions may be provided to the user for interaction. Alternatively, the cell 112 may simply represent a placeholder within the flowchart 100. For example, the cell 112 may be configured to perform no action or present no additional information; the cell 112 may simply be a logical placeholder that identifies the end(s) of one or more paths emanating from the branches 116, 118 and 120.

A cell 114 may be defined, in this example, subsequent to the branches 106, 108 and 110, and one more actions or cells representing actions as shown by the placeholder cell 112. In this example, the cell 114 may be a reference cell that is associated with the cell 104. This association allows the value of the reference variable, in the present example it is the value of the variable g.wanttogoout that was provided or entered by the user at cell 104, to be utilized or accessed by the cell 114 during playback. Thus, because the user made a selection or provided information during playback and in response to the question 104a that directed the flow of the multimedia experience along the branch 116, the same information stored in the reference variable may be utilized by a subsequent portion of the multimedia experience to direct the flow along a branch 116'.

Figure 2C:
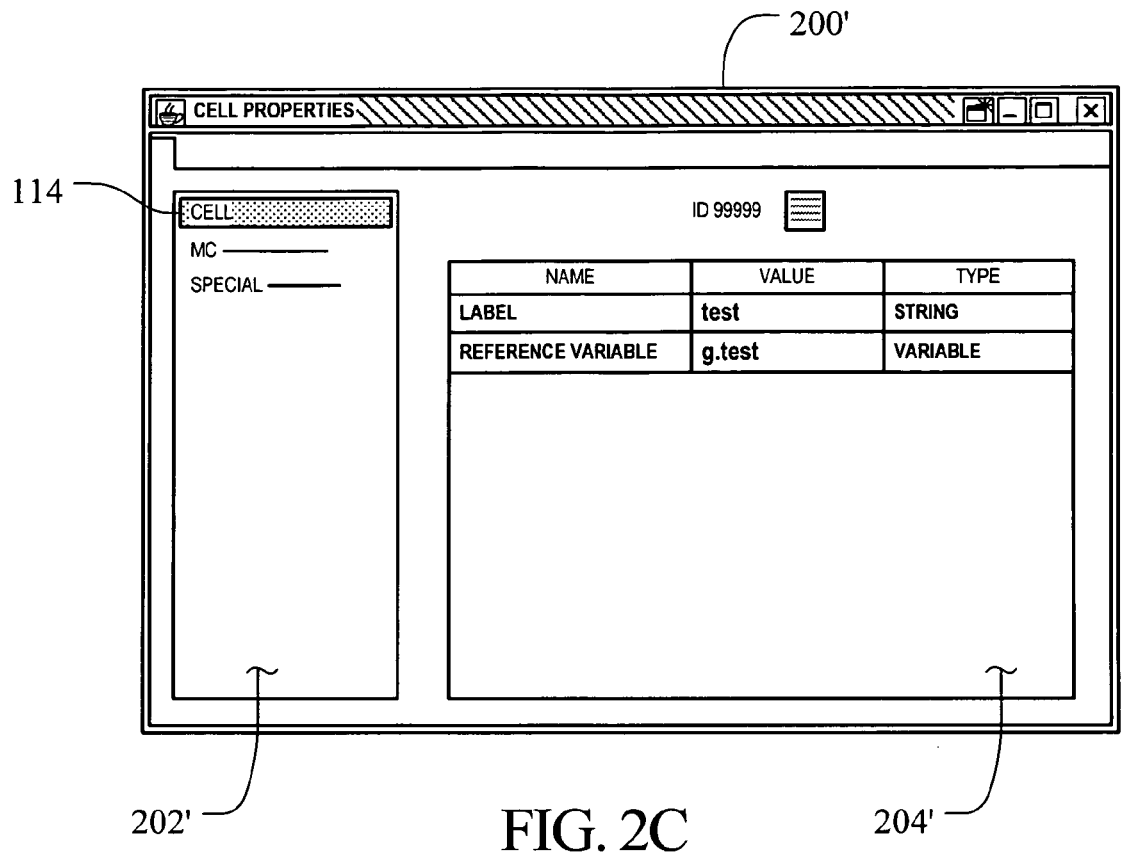

FIG. 2C illustrates an embodiment of a cell properties window 200 that may be associated with the reference cell or cell 114 shown in FIG. 1. In this example, the reference cell 114 is associated with the variable g.test that may be defined or provided in the cell 104. In this example, the means by which this association is made may include any of the following: the cell 104 may be selected or associated by identifying the input cell identifier such as a system-generated number or name; the cell 104 may be identified by reference to a designer-assigned name; the graphical symbol of the cell 104 may be physically selected or utilizing an input device; or the name of the variable g.test may be selected or input into the cell properties associated with the reference cell 114 using an input device. Regardless of how the association is established, it provides a means for the system to determine which branch of the reference cell to follow during playback as a result of activity associated with the associated input cell; in this example, such activity is the receiving of input from the user at an earlier point during playback. The reference cell

114, at the time of definition or creation, includes no branches. In this example, the reference cell 114 references or identifies the variable (g.test) to which it has been assigned, such assignment having been made in conjunction with or subsequent to its initial creation or definition.

Figure 2D:
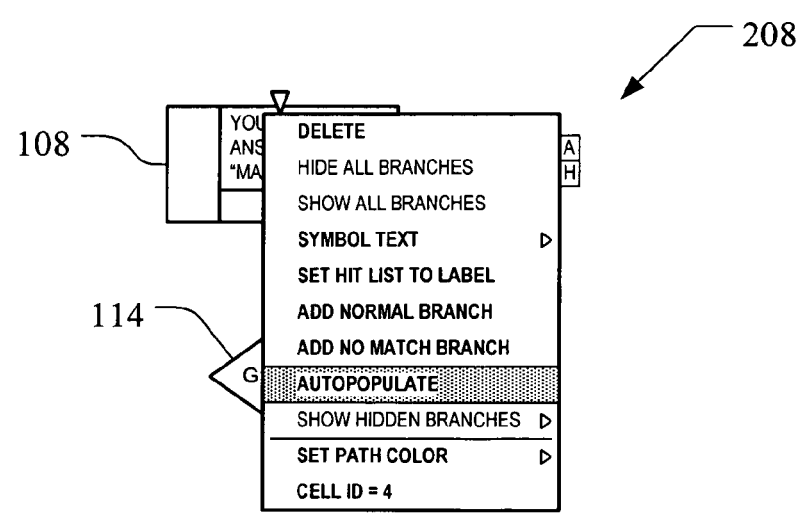

FIG. 2D illustrates a contextual menu 208 that be accessed as a part of the GUI that displays the flowchart 100 representing the multimedia experience. For example, after defining the reference cell 114, and then associating with the reference cell 114 the variable 206 ("g.test"), the designer may right-click, i.e., select the right mouse button, while indicating the access the contextual menu 208 associated with the reference cell 114 and/or GUI. By selecting the "Autopopulate" feature provided on the contextual menu 208, the designer may associate or copy some or all of the properties established in connection with the cell 104 to the reference cell 114. Alternatively, the Autopopulate feature may be implemented or executed automatically and immediately after the reference variable, in the present example g.test, is assigned or associated with the reference cell 114. In yet another embodiment the Autopopulate feature may be implemented or executed at any point during the design and creation of the multimedia experience thereby allowing multiple referenced cells (not shown) to be configured and populated by the execution of a single feature or command.

Figure 2E:
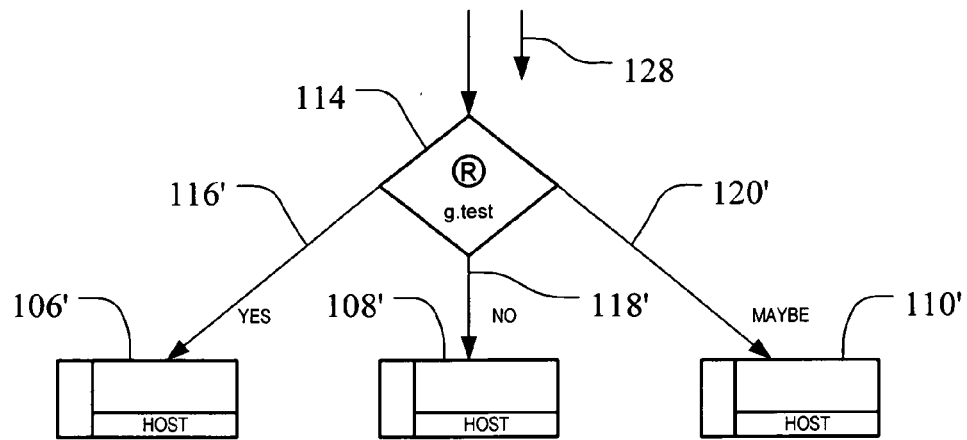
Figure 2F:
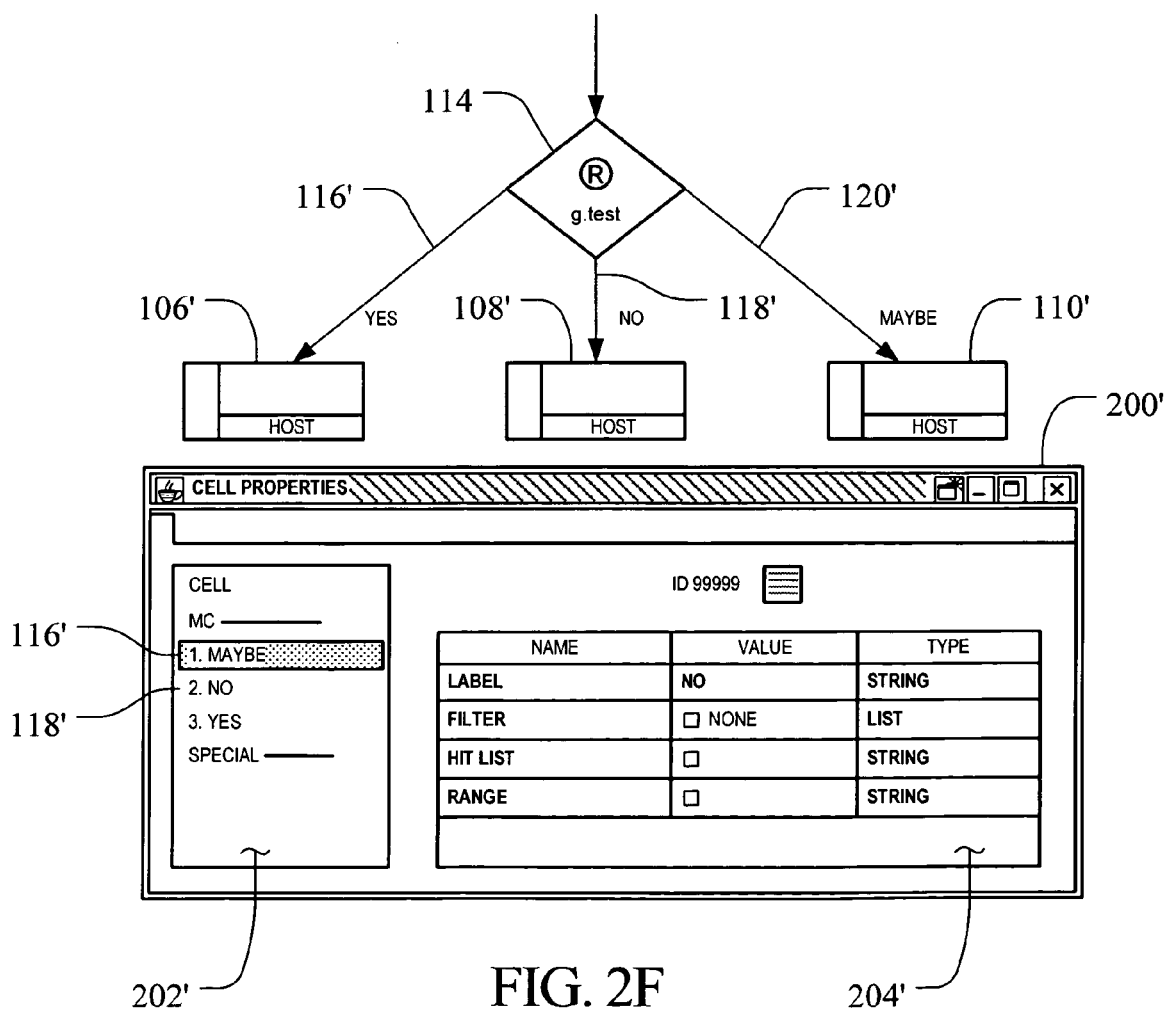

FIGS. 2E and 2F illustrate the branches 116', 118' and 120' and associated cells or branching locations 106', 108' and 110' that may be automatically created or established upon autopopulating the properties of the reference cell 114 with the information or values provided in connection with the referenced or input cell 104. In other words, the original branching and/or flow structure defined or represented in conjunction with the cell 104 can be automatically reproduced when the reference cell 114 and more particularly the reference variable, in this case the variable g.test, are linked to the cell 104. The values associated with the branches 116', 118' and 120' created as a result of invoking the Autopopulate feature shown in FIG. 2C correspond to the values associated with the branches 116, 118 and 120. The value "No" associated with the branches 118 and 118' are indicated or selected in the element window 202'. In another embodiment, the designer may select and copy the cell 104 and all of the branches associated therewith, and create a copy of the selected cell 104, including all of its properties, to a different location or portion of the flowchart 100 representative of the multimedia experience. The original or copied cell may, in turn, be changed or converted into a reference cell that includes the relevant cell properties and information related to the assigned or reference variable, branching structure, etc.

Figure 3A:
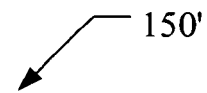

It will be understood that many structures, procedures and memory arrangements may be utilized to establish the linking and/or Autopopulate features discussed above. FIGS. 3 and 3A illustrates alternate examples, structures and information that may be communicated or utilized in conjunction with the linking and Autopopulate features described herein.

In an alternative embodiment, the variable may be identified as g.wanttogoout, and may in this example store or save a value corresponding to the "Yes" response 104b as shown in FIG. 2. The cell 104 may, in turn, utilize the value of the stored variable g.wanttogoout to direct the flow of the flowchart 100 as graphically shown in FIG. 1 and indicated in the table 150 provided in FIG. 3. Alternatively, multiple variables may be defined based on the respective states or options available to the user. For example, variables names "Yes", "No" and "Maybe" may be defined based on the answers to question 104a. Thus, in this case, the name or identifier related to the variable, and not a separate value associated with the variable, may be utilized to determine along which path or branch within the flowchart 100 the multimedia experience is to proceed.

The table 150 indicates an alternate manner in which the properties, links and characteristics of the cell 104 may be organized and stored. Thus, when the cell 104 is defined to reflect the three different states or conditions, e.g., Yes, No, and Maybe, associated with the variable g.wanttogoout, a matrix may be established to store and organize this information. For example, the different or possible states and conditions of the variable g.wanttogoout may be laid out in a matrix so that it is stored and accessible to other elements of the multimedia experience. In the present example, the "Yes" response or condition 104b corresponds to a value of one (1) to indicate that it is the selected option. The remaining "No" and "Maybe" responses 104c and 104d correspond to zero (0) values to indicate that they are not the options which were selected by the user in cell 102. Thus, if the matrix presented by table 150 were to be scanned in association with the variable g.wanttogoout, the "Yes" condition or response would contain the only indication that it was identified or selected during the run or execution of the multimedia experience.

The table 150 may include additional information to indicate the branches or links that correspond to each of the values associated with the variable. For example, row one (1) of the table 150 shows that when the "Yes" response 104b is selected, the value of the variable g.wanttogoout is set to one (1) and an association is established between the cell 104 (in which the variable is stored or associated) and the cell 106 along the path or branch 116. Similarly, rows two (2) and three (3) of the table 150 show the associations between the "No" response 104c and the cell 108 along the path or branch 118, and the "Maybe" response 104d and the cell 110 along the path or branch 120. The table 150 may further include an indication of the type of cell, e.g., a simple cell, a conditional cell, an input cell, etc. to which the cell 104 is associated. Thus, the properties, links, text, media, conditions, etc., associated with the input cell may be identified and stored for later manipulation within multimedia experience in general, and individual cells or portions of the flowchart 100 in specific.

It will be understood that the table 150 may be a cell properties window or input box that is automatically created or defined when a conditional cell, such as the cell 104, is inserted into the flowchart 100. Alternatively, the information or entries provided in the table 150 may be automatically created or populated as the cells and links are graphically established within the flowchart 100. For example, when the branch 118 is established between the cell 104 and the cell 108, the link information may automatically be recorded in the table 150, or some other retrievable format. Similarly, other characteristics or properties of the cells may be recorded in individual cell properties windows as they are defined during the design of the multimedia experience embodied by the flowchart 100. In this way, the designer may compile and assemble the necessary information by manipulating the graphical symbols and elements of the GUI. Alternatively, the designer can "right click" or otherwise explicitly select the properties to be defined by selecting pull-down menus, icons or other known indication techniques.

It will be understood, that the relationship between the cell 114 and the cells 106', 108' and 110' can be manually or graphically defined as discussed above in connection with the cell 104 and the cells 106, 108 and 110. Thus, each of the preferences and properties defined in table 150 may be redefined or reflected in a table 150' (see FIG. 3A) associated with the cell 114. Alternatively, the information originally utilized to define the preference, properties and branches associated with the cell 104 could be used to automatically define the related properties, functions and branches with the reference cell 114. Thus, the information stored or contained within the table 150 may be utilized to automatically populate the table 150' thereby saving programming and configuration time and reducing unwanted errors or confusion.

The table 150' may be a separate memory construct or location associated with either of the cell 104 or cell 114, or it may be stored in a common location and accessible by any and all of the cells referenced thereto. For example, if a database or memory matrix were established in connection with the flowchart 100 representing the multimedia experience, the information necessary to define the logical relationship between the cell 104 and the cells 106, 108 and 110 may be stored and accessible therein. Thus, when another cell references this previously defined cell, these logical relationships may be automatically transferred to the reference cell.

FIG. 3B illustrates an expanded table 150' that may be manually or automatically created in order to associate the cell 104 to the cell 114. As previously discussed, the rows one (1) to three (3) represent one manner in which information related to the properties and logical relationship associated with cell 104 may be defined. Row four (4) indicates the reference cell identification (ID) or referenced cell is the cell 104. Similarly, row five (5) indicates that cell making the reference is the cell 114. Alternatively, this relationship could be established by selecting or otherwise indicating that the cell 104 is to be referenced when the cell 114 is being defined or created. Row five (5) may indicate that the status and/or properties of the linked or references cells are integrated or synchronized. Thus, if a referenced or shared property in the cell 114 is altered or updated, the changes can be automatically reflected in the shared properties of the cell 104 and vice versa. For example, if the cell 108' were changed from a simple cell to a group cell, the corresponding cell 108 could be automatically updated to be a group cell. Alternatively, this synchronization may be selectively invoked and configured to provide for the adding, deleting, or updating of variable and/or branches associated with the reference cell 114 based on any changes made to the input cell 104 within a given time period or since the last update was conducted.

In another embodiment, the use or implementation of a variable within the flowchart 100 may be the basis for automatically creating a desired structure or relationship. For example, the cell 104 includes three (3) branches 116, 118 and 120 that are related to the variable g.wanttogoout. If a second cell 104' (not shown) were defined to have the same structure, i.e., three (3) branches, and the cell 104' were also associated with the variable g.wanttogoout, and each of these three (3) branches are distinct from all three branches of the first cell 104, then when the cell 114 references the g.wanttogoout variable, six (6) branches may be automatically created to reflect the possibilities established throughout the flowchart 110.

The examples provided above illustrate embodiments in which reference variables and the values which may be associated therewith are utilized to automatically populate or define the structure or branches of a cell that is referencing or associated with the variable. In other known programming schemas, the structures, values and properties of an input or reference cell may be copied using known GUI manipulation techniques and pasted or pasted special onto a second or referencing cell.

In another embodiment the updating or synchronization between, for example, the cell 104 and the cell 114 may be a partial synchronization. In particular, the structure of the cells or branches may be updated based on one or more rules or condition such as, for example, when (i) a branch is added; (ii) a branch is deleted, or (iii) a property of a branch or the branch itself is altered or changed. These strategies may be implemented to maintain the consistency between the selected cells or to otherwise reflect desired changes within the flowchart 100. Moreover, the updating or synchronization operation may include logic or guidelines that could prevent duplicate or unwanted branches from being defined. For example, if the cell 104 were referenced multiple times, it may be desirable to prevent multiple copies of the same branch and/or cell arrangements to be repetitively created. Alternatively, the condition or conditions that may trigger or initiate a synchronization operation could be utilized trigger or generate a warning or report which, in turn, may allow the designer or user to manually evaluate or correct the difference or discrepancy identified between cells, groups and branches.

In another embodiment, the types or classes of branches that are automatically created by the association of the cell 114 to the cell 104 may be limited or defined. For example, the cell 104 may include a time-out branch that directs the user down a portion of the multimedia experience when a requested input (e.g., an input from the cell 104) is not received within a certain, pre-defined period of time. It may be desirable to prevent these branches from being recreated at the reference cell 114. In another embodiment, individual branches (as opposed to whole groups or classes of branches) may be identified or otherwise eliminated when auto-population is enabled or executed.

In another embodiment, the response or variable provided via an input cell, e.g., cell 104, may include one or more logically equivalent permutations. In this instance, the logically equivalent permutations may be mapped or associated with a desired predefined response. For example, if the expected answer to a question is defined to be "USA", a user may input: "United States;" "America;" and "US;" then the multimedia experience can map or associate these provided responses with the expected response in order to determine along which path the experience is to proceed. Thus, one variable may be utilized to determine the flow or path of the experience and another variable may be utilized to store the provided response. Both of these variables, in turn, may be copied or otherwise reproduced when another cell references one or both of these variables. Because this information remains stored and accessible, the multimedia experience can immediately access it to determine the experience flow without having to remap the variable each time a branch must be selected.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A method for supporting the creation of a multimedia experience, the method comprising:
   generating a flowchart representative of a multimedia experience including:
      defining a first cell,
      defining a first branch having a first value, wherein the first branch is associated with the first cell,
      defining a second branch having a second value, wherein the second branch is associated with the first cell, associating a user-identified variable with the first cell wherein the user-identified variable is associated with the first and second values, defining a second cell, associating the second cell to the user-identified variable, and generating automatically a third branch and a fourth branch associated with the second cell based on an association of the second cell to the user-identified variable such that one of a group consisting of the third and fourth branches reflects the first value, and the other of the group consisting of the third and fourth branches reflects the second value; and providing logic configured to prevent the creation of duplicate branches during a synchronization operation.

2. The method of claim 1, wherein the third and fourth branches are copies of the first and second branches.

3. The method of claim 1, wherein a generation of the third and fourth branches is initiated automatically in response to associating the user-identified variable to the second cell.

4. The method of claim 1, wherein a generation of the third and fourth branches is initiated in response to an instruction from a user.

5. The method of claim 1, wherein the third and fourth branches are synchronized with respect to the first and second branches.

6. The method of claim 5, wherein a modification to one of the branches initiates a synchronization operation.

7. The method of claim 6, wherein the modification is a condition selected from a group consisting of: (i) a branch is added; (ii) a branch is deleted, and (iii) a property of a branch is altered.

8. The method of claim 1, wherein the first cell is an input cell and the second cell is a reference cell.

9. The method of claim 1, wherein at least one of a group consisting of the first and second cells is an input cell configured to receive an input selected from a group consisting of: a user selection, program variable or a database record.

10. The method of claim 1, wherein at least one of a group consisting of the first and second values identifies a path defined at least by the first cell and one of the first and second branches, and the second cell and one of the third and fourth branches.

\* \* \* \* \*